United States Patent [19]
Dell'Oro et al.

[11] Patent Number: 5,177,738
[45] Date of Patent: Jan. 5, 1993

[54] PROCESS AND A MONOLITHICALLY INTEGRATED DEVICE FOR SPEED ADAPTATION FOR INTEGRATED SERVICES DIGITAL NETWORK (ISDN)

[75] Inventors: Annalisa Dell'Oro, Villasanta; Fulvio Corazzo, Gorgonzola; Pietro Tognini, Vignate; Stefano Conegian, Nova Milanese, all of Italy

[73] Assignee: SGS-Thomson Microelectronics s.r.l., Italy

[21] Appl. No.: 606,693

[22] Filed: Oct. 31, 1990

[30] Foreign Application Priority Data

Oct. 31, 1989 [IT] Italy ................. 83645 A/89

[51] Int. Cl.$^5$ .............................................. H04J 3/22
[52] U.S. Cl. ......................................... 370/84; 370/82
[58] Field of Search ............. 370/105.1, 84, 82, 100.1, 370/99

[56] References Cited

U.S. PATENT DOCUMENTS

| | | | |
|---|---|---|---|
| 4,566,099 | 1/1986 | Magerl | 370/105.1 |
| 4,979,169 | 12/1990 | Almond et al. | 370/105.1 |
| 5,007,088 | 4/1991 | Ooi et al. | 370/105.1 |

Primary Examiner—Douglas W. Olms
Assistant Examiner—Min Jung
Attorney, Agent, or Firm—Pollock, Vande Sande & Priddy

[57] ABSTRACT

The process of synchronization and decomposition of asynchronous frames organized with octet-rows of bits, for the adaptation of speed carried out by an intermediate reception block for adaptation of speed of an integrated device for the adaptation of synchronous and asynchronous terminals according to the CCITT V.110 standard to an Integrated Service Digital Network, is carried out by storing one octet at a time in an 8-bit shift register and by using counters in order to store the current position of each octet within a respective asynchronous frame and by recognizing by means of other counters and relevant bits of each octet, which are stored and switched to the respective elements for management and for control of the serial flow of data from the network to the terminal. From this, an architecture is derived, which is particularly simplified by means of the redimensioning of the registers which, instead of storing an entire frame, have to store only one octet at a time. Also, the delay undergone by the data in transfer by means of the block is reduced to the delay necessary for the shifting of a single octet. In fact, there will never be more than two octets at a time contained within the block instead of two frames or one, as would be necessary according to an architecture of conventional type. Two PLAs, each functioning with its own clock, manage and control the synchronization, the decomposition of the frames into octets and the addressing of the bits and, respectively, the flow of the data in input to an in output from the block in relation to said standard.

13 Claims, 2 Drawing Sheets

PROCESS AND A MONOLITHICALLY INTEGRATED DEVICE FOR SPEED ADAPTATION FOR INTEGRATED SERVICES DIGITAL NETWORK (ISDN)

The present invention relates to a rate adapter for the connection to the Integrated Services Digital Network (ISDN) of synchronous and asynchronous terminals which conform to the current CCITT series X and V specifications. The system implements the functions required by the relevant CCITT V.110 standard for the adaptation of synchronous terminals of the series X.21, X.21b, V.24 and RS 232, and of asynchronous terminals of the series X.20, X.20b, V.24 and RS 232.

The techniques of rate adaptation are of particular importance in the interfacing of terminals with telecommunication networks. In particular, the introduction of the new Integrated Services Digital Network (ISDN) has rendered necessary the interfacing of low-speed terminals with the B channel of the ISDN, which is characterized by a speed of 64 kbits/second, as per CCITT series I standard.

The adaptation of speed within the ISDN context can be carried out effectively by means of the implementation of the CCITT V.110 recommendation, which is based on the logic composition and decomposition of a matrix or frame of predetermined format.

In the reception phase of the network, the input data are bits structured in octets grouped together in asynchronous frames of different length containing synchronization data. It is therefore first necessary to look for the frame synchronization and subsequently to arrange the octets received in the predetermined position within the preconfigured matrix. The matrix thus constituted will contain "data bits" and other additional information which will be switched to the control blocks, whereas the single data bits will be carried to the output, at a suitable speed, which is, however, lower than the input speed. This description, although brief, demonstrates the necessity of providing for the synchronization and for the composition/decomposition of asynchronous frames.

Rate adaptation is of course implemented simultaneously in both directions, which can be defined as of "transmission" and of "reception" respectively. In reception mode it is the synchronization and decomposition of the frames which is required, whereas in transmission mode the opposite operation of composition of the frames and generation of synchronization bits is required.

Within the context of such a system, the "reception" block, which implements the functions of synchronization and decomposition of the frames for the connection of asynchronous terminals to the network is of fundamental importance.

The "reception" block, as shown schematically in FIG. 1, has to adapt the DATAIN data flow into a DATAOUT data flow, both serial and synchronous with the respective CKIN and CKOUT clock signals.

It must be noted that, in accordance with the standards mentioned, the ratios of the CKIN and CKOUT clock signals can exclusively be 5/3 or 4/3, as illustrated in table 1 below.

TABLE 1

| CKIN | CKOUT | number of bits per frame | ratio |
|---|---|---|---|
| 8000 | 4800 | 80 | 5/3 |
| 16000 | 9600 | 80 | 5/3 |
| 32000 | 19200 | 80 | 5/3 |
| 64000 | 38400 | 80 | 5/3 |
| 64000 | 48000 | 32 | 4/3 |

Also in accordance with the abovementioned standards, according to the value of this ratio, the frames in transfer will be composed and subsequently decomposed according to the two different matrix structures indicated below.

| row/octet number | Bit/column number | | | | | | | |
|---|---|---|---|---|---|---|---|---|
| | 1 | 2 | 3 | 4 | 5 | 6 | 7 | 8 |
| MATRIX 1 for RATIO 5/3 | | | | | | | | |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D31 | D32 | D33 | D34 | D35 | D36 | X |
| 8 | 1 | D37 | D38 | D39 | D40 | D41 | D42 | S8 |
| 9 | 1 | D43 | D44 | D45 | D46 | D47 | D48 | S9 |
| MATRIX 2 for RATIO 4/3 | | | | | | | | |
| 1 | 1 | D1 | D2 | D3 | D4 | D5 | D6 | S1 |
| 2 | 0 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |

The two matrices have similar structures and differ fundamentally in dimensions (number of rows).

The organization of the information in the two matrices is as follows respectively:

Information Field of Matrix 1 row 0 and column 1: synchronization pattern
row 5: information for microprocessor (E bits)
column 8: control bit (S, X bits)

The remaining bits (D bits) are the data bits to be transmitted on the OUTPUT line. Frame of 80 bits.

Information Field of Matrix 2 column 1: synchronization pattern
column 8: control bit

The remaining bits (D bits) are the data bits to be transmitted on the OUTPUT line. Frame of 32 bits.

In the reception phase, therefore, the relevant circuit block for synchronization and decomposition of the frames of the system receives the serial data flow on the DATAIN input line at the speed fixed by the CKIN clock signal without any explicit information on the beginning and the end of each frame of data, and thus the operation of synchronization and of logic decomposition of a frame has to take place by means of the following operations:

1. Looking for the synchronization pattern
    The synchronization pattern is the logic element for identification of the beginning of a frame and thus makes it possible to position the bits received in the correct position within the matrix. Looking for the synchronization pattern within the serial frame is carried out at the beginning of the operations and controlled with each frame received.
2. Composition of the frame This operation is to be understood as the positioning of the bits in the correct position within the matrix, whether the latter is a matrix of type 1 (of 80 bits) or a matrix of type 2 (of 32 bits).

3. Selection of the bits

From the matrix thus composed, the data bits which are to be transmitted to the DATAOUT output, the control bits which are to be transmitted on the control lines and the supervision bits intended for the supervision microprocessor are selected.

4. Decomposition of the frame

This expression is to be understood as the switching of the bits thus selected to the respective lines.

5. Control of the synchronization

The control of the synchronization pattern is carried out with each frame. In the event of a negative result, that is to say of loss of synchronization, the state of anomaly is signalled and the system returns to point 1, in order to carry out the described sequence of operations again.

A canonical solution for making such a system would consist in treating the frame in its entirety, that is to say storing 80 bits (or 32 bits) and recognizing the complete frame when the synchronization bits, entering into a shift register, have arrived in the position intended for them in the matrix. Once the configuration of a frame has been recognized, it can be saved (stored) in a second register, while the input flow continues to shift into the first register. A first state machine will provide for the control of the composition of the frame in the first register at the appropriate moment and for the maintenance of the frame synchronization and for the control of the loading of the frame composed in the second register at the appropriate moment.

After a first phase of recognition of the synchronization on the part of the state machine, it will be possible to use a counter which, upon the run-out of the 80th (or of the 32nd) bit, will inform the state machine that a new incoming frame is complete in the first register. In the synchronous functioning phase, the state machine, which has initially looked for the synchronization, will control, upon the run-out of the counter, the correctness of the synchronization pattern and will order the loading of the frame in the second register.

The management of the data in output from such a reception block can be carried out by a second state machine functioning with the same clock as the data output. This second state machine, having available the entire frame in the second register, will be in a position to select the bits to be transmitted in the various directions, taking them directly from their position in the matrix. In particular, it will be possible to load the data bits into a third shift register which will unload them in output. It will be possible to address the octet intended for the supervision microprocessor separately in relation to the data, whereas it will be possible to address the data of the control lines in a similar manner in output according to the requirements of the abovementioned standards.

In the case of the second type of frame of 32 bits, it will be possible of course for the system to use the same structure, making use of only a part of it.

SUMMARY OF THE INVENTION

Compared with this state of the art, the subject of the present invention is a different process of synchronization and composition/decomposition of asynchronous frames, which advantageously leaves out of consideration the necessity of storing and handling the entire frame of data while fully respecting in its effects what is laid down by said standards, acting on the basic element of organization of the data in the serial flow, which is the octet, rather than on a complete frame, and a relevant monolithic device which integrates the entire system for adaptation of speed for an Integrated Services Digital Network (ISDN) for the adaptation of synchronous and asynchronous terminals according to the CCITT V.110 standard.

Fundamentally, the system acts on the octets, in which the serial flow of data is structured, identifying, by means of the use of simple counters, their respective position in the frame and managing the data obtained in each octet according to what is required by the specifications.

The major advantages of this system architecture are mainly due to the reduction in complexity and thus also in space occupied and in cost.

In fact, in relation to a conventional solution based on the storage and handling of entire frames (or at least of semi-frames), an advantageous redimensioning of the registers is brought about, which instead of storing the frame, composed at least of 10 octets, have to store only one octet at a time.

The architecture of a device made according to the present invention is such that the control blocks are also simplified, since complex address generators and multiplexers for selecting from time to time the octet concerned in the frame are no longer necessary as in the case of a solution of conventional type, on the contrary, it is sufficient to order from time to time the loading of the single octet present in a given register.

The delay undergone by the data between the input of the reception block and the output from the same is also reduced considerably in a device made according to the present invention. In fact, the delay caused, in a system of conventional type, by the shifting of the entire frame or semi-frame in input before the recognition of the synchronization and the transmission of the same, is reduced essentially to the delay attributable to the shifting of a single octet of data, other conditions being the same. In fact, in the system of the invention, there will never be more than two octets present at a time within the reception block instead of the presence of two frames or of one as is the case in a system of conventional type.

The special relationship between the clocks for the data in input and in output laid down by the standards is also exploited in an improved manner.

For the purpose of better illustrating the invention and its advantages and of rendering its practical implementation more immediate on the part of a person skilled in the art, the description follows of a monolithically integrated device, called IBRA, which has a "reception" block architecture according to the present invention.

DESCRIPTION OF THE PREFERRED EMBODIMENTS

The IBRA device made according to the present invention is usually manufactured with CMOS VLSI technology in a package with 44 pins of the PLCC type, although it can also be made in another form, and can be connected in a bus configuration in order to implement the function of Adapter for Multiple Terminals as is normally required in PABX line cards.

Figure 1:
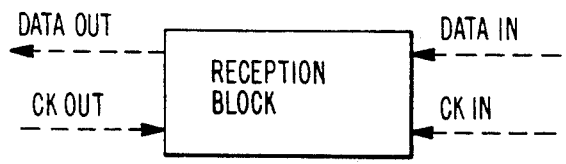
FIG. 1 is a representation of the equivalent quadrupole of a "reception" block of a system for adaptation of speed as already described above.
Figure 2:
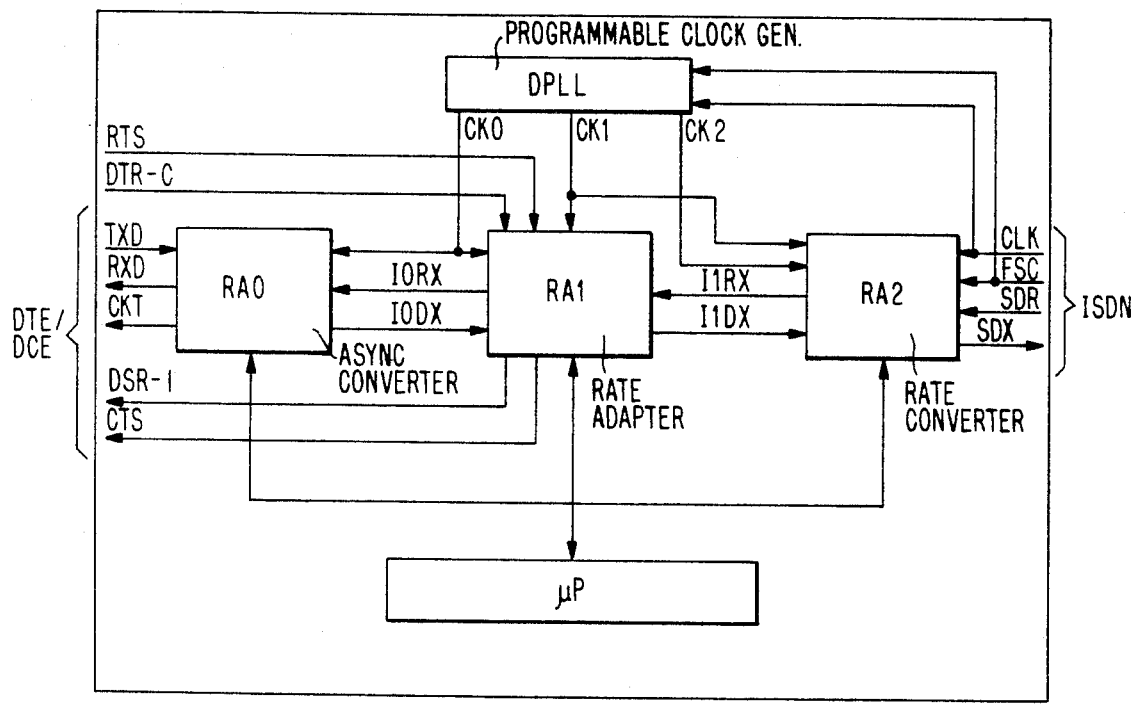
FIG. 2 is a simplified block diagram of a monolithic device for adaptation of speed for ISDN made according to the present invention.

The general structure of the device made according to the present invention is shown in the simplified block diagram in FIG. 2, in which the fundamental blocks and the respective main connections between them are illustrated. These connections are identified by means of abbreviations. Functionally, the monolithic device has a certain number of pins available for the physical connection to an interface of standard data transmission equipment (DTE) or of data communication equipment (DCE) and for the connection to the network (ISDN), which are identified as follows:

| Abbre-viation | Typology | Function | Standards X21 | V24/X21b |
|---|---|---|---|---|
| DTE/DCE INTERFACE | | | | |
| RTS | I | Request to send | C | 105 |
| DTR_C | I | Control/state of readiness of data terminal | C | 108 |
| TXD | I | Data transmission | T | 103 |
| RXD | O | Data reception | R | 104 |
| CKT | I | Clock reference signal | | |
| DSR_I | O | Indication of state of readiness of a data set | I | 107 |
| CTS | O | Clear to send | I | 106 |
| ISDN INTERFACE | | | | |
| CLK | I | Clock reference signal. The clock frequency is equal to or double the data speed on SDR and SDX, according to the programmed mode (PCM/SSI, GCI). | | |
| FSC | I | Frame synchronism clock. This is the reference frame signal for SDR and SDX. An 8 kHz clock is necessary to supply the integrated device with the frame synchronization signal. | | |
| SDR | I | Serial data in reception from the network at TTL or CMOS standard level. Advantageously, an internal pull-up circuit makes possible the connection of a pilot stage of the open-drain (or open-collector) type, without any external resistance. | | |
| SDX | O | Serial data in transmission to the network at a TTL or CMOS | | |

| Abbre-viation | Typology | Function | Standards X21 | V24/X21b |
|---|---|---|---|---|
| | | standard level. | | |

The integrated device in its entirety will of course be provided with other external pins for the power supply, for the connection of crystals for the control of the frequency of the clock signals, for the bus connection for addressing data and commands from the device to a supervision microprocessor and vice versa, in addition to a number of multifunctional input and output pins and other pins for indicator and control signals, which are not illustrated in the simplified diagrams so as not to burden the description with a mass of information which is of an essentially obvious character to a person skilled in the art and above all not pertinent to the description of what characterizes the invention claimed here, as is defined in the attached claims.

As illustrated in FIG. 2, IBRA is structured so as to comprise an asynchronous/synchronous converter block RA0 which is capable of transforming a flow of start/stop formatted characters (originating from a DTE/DCE interface by means of the line TXD) into a synchronous flow of bits (on the line I0DX) at a speed of $2^n$ times 600 bits/second, where n has a value 0, or 1, or 2, or 3, or 4, or 5, or 6, and vice versa. The possible asynchronous speeds of the data in input are 300, 600, 1200, 2400, 4800, 9600, 19200 and 38400 bits/second. All these speeds are synchronized maintaining the same speed with the exception of the lowest speed, which is raised to 600 bits/second by filling the empty time between the characters with stop bits (of high level). The asynchronous speed in both directions is the same. The terminal DTE or DCE can transmit a character or an interruption or maintain a high pause level. The character is formed by a start bit (of low level), of M data bits and of 1 or 2 stop bits. The interruption is a signal at low level of a duration at least equal to that of a character including the start and stop bits. The asynchronous interface detects a character by recognizing the start bit (of low level) and the stop bit (of high level) at the distance M, where M is the number of data bits of the character fixed by the microprocessor. The data in input are read with a clock CKT 16 times faster than the nominal data clock CK0. Asynchronous transmission speeds of the terminal which are comprised within a certain range of tolerance are compensated automatically by the converter by means of the insertion of additional stop bits between the transmitted characters or by means of the elimination of stop bits.

The serial flow of the data within the device from and to the block RA0, for the two directions of transmission of data from the terminal and reception of data from the network respectively, takes place by means of the two respective lines I0DX and I0RX. The intermediate block RA1 for adaptation of speed performs the following functions respectively:

Functions in the Direction of Data Transmission from the Terminal to the Network Construction of the frame with a matrix of 32 bits in the case in which the terminal DTE has a speed of 48 kHz or of a frame with a matrix of 80 bits in other speed conditions as required by the CCITT V.110 standard. The input pins DTR_C and RTS are controlled and the data present transmitted in a frame with the frequency defined by said standard.

Insertion of data bits (D) originating from the interface of the terminal DTE or from the asynchronous-/synchronous converter RA0 with or without repetition of the same.

Insertion of state bits. These bits either originate from the microprocessor or inform of the state of the interchange circuits of the terminal at specific sampling points according to the recommendations X.30 or V.110, for example the bits S1, S3, S4 to S9 of the frames illustrated above. Insertion of X bits originating from the supervision microprocessor or from the interface of the terminal DTE and of the E bits, six of which originate from the microprocessor whereas the seventh (E7 of the frame with 80 bits described above) is generated automatically by the transmission block of the intermediate block RA1.

Functions in the Phase of Reception of Data from the ISDN Network

The functions carried out in the phase of reception from the relevant reception subblock constituting the intermediate block for adaptation of speed RA1 in FIG. 2 will be illustrated in detail in the course of the present description.

The block RA2 essentially constitutes a synchronous network interface. The lines I1DX (input of data originating from the intermediate unit RA1) and SDX (output of flow of data transmitted to the ISDN network) and the lines SDR (input of data originating from the ISDN network) and I1RX (transfer of the data in reception to the intermediate block for adaptation of speed RA1) constitute the respective routes of the flow of data in the two directions.

The block RA2 converts the intermediate speed: 8 kbits/second, 16 kbits/second or 32 kbits/second into the carrier speed of 64 kbits/second in transmission and vice versa in reception. The block RA2 passes the data transparently if the speed of the latter is greater than or equal to 38400 bits/second.

The μP INTERFACE is an 8-bit parallel interface for a microprocessor provided with 13 lines and is directly compatible with microprocessors of the multiplexed address/data-bus type.

This block interfaces with the supervision microprocessor during the initial phase of programming of the integrated circuit and on every occasion when the circuit requires an interrupt or the microprocessor transmits and/or receives data to or from the ISDN network by means of its own parallel bus.

This block is constituted by two main parts called "RAM" and "GI" respectively. The subblock RAM contains all the write registers necessary for programming the integrated device in the desired configuration and the read registers for permitting the microprocessor to gather information from the integrated circuit. The block GI detects the change of a particular interrupt signal and stores this information if the interrupts concerned are masked or provides the interrupt immediately to the microprocessor if the same are not masked.

As soon as the masked interrupts required are unmasked, they are immediately supplied to the microprocessor.

The block DPLL is a programmable clock generator synchronized by the FSC network reference clock and driven by an external source, for example at 10.752 MHz ±100 ppm. The block provides the clock signals CK0, CK1 and CK2 used by the different functional blocks (RA0, RA1 and RA2).

Figure 3:
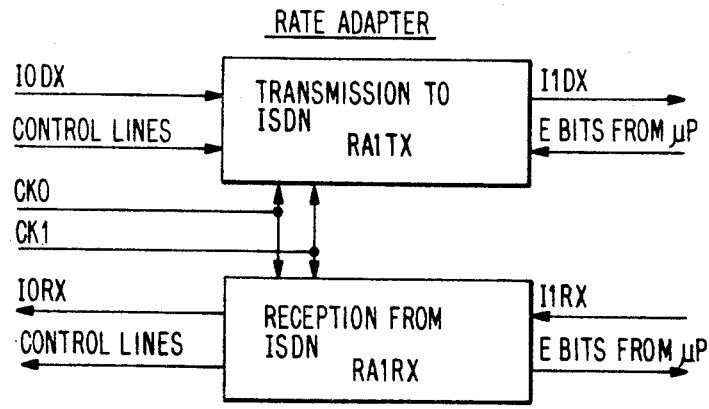
FIG. 3 is a simplified diagram of the intermediate block RA1 of the block diagram in FIG. 2, subdivided functionally into a transmission block and a reception block.

The core of the device is constituted by the intermediate block for adaptation of speed RA1, which, as indicated in FIG. 3, is composed of 2 semi-blocks: RA1TX and RA1RX, the former operating in the phase of transmission of data from a terminal DTE/DCE to the ISDN network and the latter operating in the phase of reception of data from the ISDN network to a terminal DTE/DCE. In the "quadrupole" illustration of the two blocks RA1TX and RA1RX in FIG. 3, they are indicated as a whole in addition to the data flow lines, already described in relation to the diagram in FIG. 2, as well as the respective lines of the control signals and of the supervision signals from and to the microprocessor.

The description of the relevant figures up to this point represents what can be easily recognized as belonging to the state of the art with regard to these types of systems and, therefore, a more detailed illustration of these general functional diagrams appears thoroughly superfluous since a person skilled in the art is quite capable of visualizing it.

The innovative process and the relevant architecture for implementation of such process, both subject of the present invention, are essentially incorporated in said reception semi-block RA1RX of the intermediate block for adaptation of speed RA1 of the general system illustrated in FIG. 2.

Figure 4:
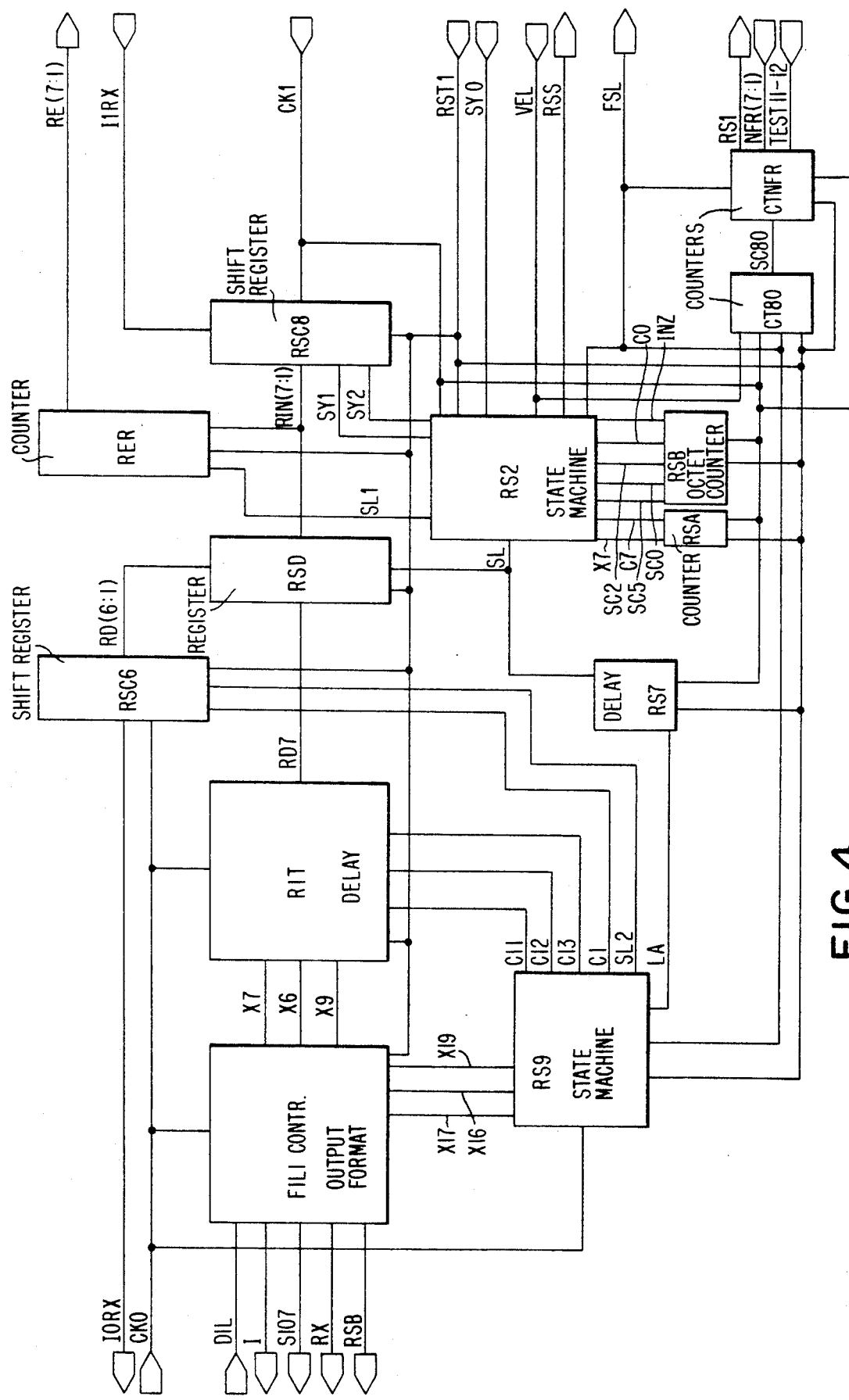
FIG. 4 is a simplified functional diagram of the reception block made with the architecture which is the subject of the present invention.

The original process of synchronization and decomposition of asynchronous frames and the architecture of the hardware which implements it will both be more simply described and indicated by referring to the block diagram in FIG. 4, which shows the organization or internal architecture of said reception block RA1RX according to the present invention.

The lines I1RX, I0RX, CK1 and CK0 in FIG. 4 correspond to the similar lines in FIG. 3, the other lines in FIG. 3 representing in practice a multiplicity of lines, which are described in relation to their specific identity in the detailed block diagram in FIG. 4.

As shown in FIG. 4, the lines in input to the reception block RA1RX are:

| | |
|---|---|
| CK1 = | clock for the data in input, |
| I1RX = | data in input, |
| RST1 = | block reset, |
| SYO = | octet synchronization (used only for the frame of 32 bits) |
| VEL = | selection of type of frame (80 bits or 32 bits) |
| NFR(7:0) = | number of frames between which it must be sought to recover synchronization after it has been lost. |
| TEST11 = | line used for testing a particular function, |
| TEST12 = | line used for testing a particular function |
| DLL = | selects a particular method of generation of the control lines |
| CK0 = | clock for the data in output: |
| and the lines in output from the block are: | |
| RE(7:1) = | E bits made available for reading on the part of the microprocessor. |
| RSS = | synchronization recovery interrupt transmitted to the microprocessor. |
| FSL = | synchronization loss interrupt transmitted to the microprocessor. |
| RSI = | synchronization impossibility interrupt after NFR frames, |
| 1 = | control line selected by DLL, |
| S107 = | control line. |

-continued

| RX = | control line. |
| RSB = | control line. |
| IORX = | data in output. |

Structurally, the reception block RA1RX of the device of the invention comprises a data transfer structure which is formed by a first 8-bit shift register RSC8 which receives, by means of the data input line I1RX, the synchronous flow of serial data at intermediate speed, originating from said synchronous network interface block RA2 in the diagram in FIG. 2. This first 8-bit shift register provides in output, by means of the line SY1, information on the presence in the register of the octet constituted by all zeros. A second register of 7 bits RSD is connected functionally in cascade in relation to said first shift register RSC8 and loads upon instruction the relevant 6 central data bits of an octet and a control line from the register RSC8. A third shift register of 6 bits RSC6 is connected functionally in cascade in relation to said second register RSD and loads upon instruction the relevant 6 data bits from the latter and provides the data bits in output on the relevant line I0RX.

A structure for switching the supervision data is constituted by a register of 7 bits RER which is connected functionally in cascade in relation to said first shift register RSC8 and which loads upon instruction the E supervision bits which have been made available for reading on the part of the microprocessor by means of the line RE(7:1).

A first structure for management and for control of the process of synchronization and of decomposition of a frame comprises a first counter for 8 bits RSA, which generates information when an entire octet has entered, shifting into the first shift register RSC8, a second programmable counter for 10 or for 4 bits, according to the dimensions of the frame selected, which counts the number of octets of a frame and provides in output a first piece of information on the end of a frame having been reached and a second piece of information on the presence of the octet of E supervision bits in the first shift register RSC8 in order to make possible the switching of the same octet of E bits to said register of 7 bits RER. A state machine RS2, operating with the clock signal CK1 for the data in input is constituted by an integrated structure PLA, which manages, in relation to the inputs of the block, the synchronization, the addressing of the octets and, in the phase of synchronous functioning, the control of the maintenance of synchronization. It orders, according to the type of octet present upon the run-out of the counter RSA and using the information obtained from the values expressed by the counter RSB, the restarting of the counter for 8 bits RSA, acting to increment simultaneously the octet counter RSB. A third counter CT80 is started by the state machine RS2 when synchronization is lost. This counter counts the shifting of a predetermined number of frames NFR in accordance with what is laid down by the standards, counting the frame bits and incrementing at the end of each count a fourth counter CTNFR before resuming the counting of the bits of a successive frame.

A second structure for management and control of the outputs comprises a second programmable state machine RS9, which is also constituted by an integrated structure PLA functioning with the second clock signal CK0 for the data in output, which is essentially slower in relation to the clock for the data in input CK1. A first delay block RS7 acts to delay the start signal of the structure for output control transmitted by the first state machine RS2. A second delay block RIT stores the signals of the control lines as these arrive in order to be capable of being provided simultaneously in output at the precise moment according to the requirements of the CCITT V.110 standard by means of an output block FILI-CONTR, which is controlled by the second programmable state machine RS9.

The internal connections or lines of the block which are shown in the diagram in FIG. 4, as they do not lead to one of the input lines or to one of the output lines already described above, and their respective function are, for convenience of explanation, listed below:

| C7 = | starting of the x 8 counter |
| SC7 = | run-out of the x 8 counter |
| INZ = | zero-setting of the counter RSB |
| C0 = | increment of the counter RSB |
| SC0 = | frame end |
| SC5 = | identification of the sixth octet containing the E bits |
| SC2 = | identification of the second octet with bits of different synchronization in the 32-bit frame |
| SC80 = | increments counter CTNFR |
| SL = | loading of the data from the block RSC8 to the block RSD |
| SL1 = | loading of the data from the block RSC8 to the block RER |
| SY1 = | recognition of the octet 0 |
| SY2 = | synchronization bits (first column) |
| RIN(7:1) = | octet present in the block RSC8 without the synchronization bit (first column) |
| RD(6:1) = | sextet of data extracted from the octet |
| RD7 = | control line extracted from the octet |
| X7 = | S1, S3, S6, S9 bit |
| X6 = | X bit |
| X9 = | S2, S8 bit |
| LA = | starting of the block RS9 |
| SL2 = | indicates whether to carry out a loading or a shifting of data in the block RSC6 |
| C1 = | orders an operation to the block RSC6 |
| C11 = | loading of the S1, S3, S6, S9 bit |
| C12 = | loading of the X bit |
| C13 = | loading of the S2, S8 bit |

We claim:

1. A process for synchronizing and decomposing asynchronous data frames of different length of a serial bit stream structured in octet-rows of bits containing frame synchronization bits and data bits, for rate adaptation of synchronous and asynchronous terminals of an Integrated Services Digital Network (ISDN) during data reception from the network comprising:
   storing one octet at a time in a shift register;
   identifying the current position of each octet shifting through said shift register within the respective asynchronous frame of said serial bit stream by first counter means;
   identifying the octets forming a complete frame by second counter means;
   loading the data bits contained in each identified octet of a frame in a parallel input data register; and,
   converting the data stored in said data register into an output serial bit stream of a rate lower than the rate of said incoming serial bit stream.

2. A data transfer apparatus for rate adaptation comprising:
   a first shift register (RSC8) for receiving a synchronous serial bit stream of a certain rate, structured in octets grouped together in asynchronous frame of different length and containing data bits and frame synchronization bits;

a first counter (RSA) for identifying the presence of a valid octet in said first shift register (RSC8);

a second counter (RSB) for identifying the octets forming a complete frame;

a first input data controller state machine (RS2) for verifying said frame synchronization bits and loading into a second parallel input register (RSD) the data contained in each octet shifting through said first shift register (RSC8) and validly identified by means of said first counter (RSA) and said second counter (RSB);

a second output data controller state machine (RS9) for controlling the loading of data from said second register (RSD) to a third register (RSC6) in the form of a serial bit stream of a rate lower than the rate of said incoming serial stream.

3. A data transfer apparatus as defined in claim 2, wherein said first shift register (RSC8) is an 8-bit register, said first counter (RSA) is programmable to count for a set number of bits in accordance with the dimensions of the frame, thus counting the number of octets of a frame and providing a first information about the end of a frame having been reached and a second information about the presence of an octet of supervision bits in said first shift register (RSC8).

4. A data transfer apparatus as defined in claim 3, wherein a 7-bit shift register (RER) is connected to said first shift register (RSC8) and loads, upon receipt of said instruction, said supervision bits, upon recognition provided by means of said second programmable counter (RSB).

5. A data transfer apparatus as defined in claim 2, wherein said first input data controller state machine (RS2) and said second output data controller state machine (RS9) are both implemented by means of integrated programmable linear arrays (PLA) and wherein the first input state machine (RS2) operates at a clock frequency higher than said second output data state machine (RS9).

6. A data transfer apparatus as defined in claim 2, wherein upon the running out of said first counter (RSA) and in function of the information provided by said second counter (RSB) said first state machine (RS2) causes a reinitializing of said first counter (RSA) and the incrementing of said second counter (RSB).

7. A second transfer apparatus as defined in claim 2, wherein said first state machine (RS2) starts a third counter (CT80) when synchronization is lost, for counting the shifting of a predetermined number of frames (NFR), by counting the frame synchronization bits and incrementing at the end of each count a fourth counter (CTNFR), before resuming the counting of the bits of a successive frame.

8. Apparatus for rate adaptation of synchronous and asynchronous terminals of an Integrated Services Digital Network which comprises a reception block and a transmission block, wherein said reception block comprises:

a first shift register (RSC8) for receiving a synchronous serial bit stream of a certain rate, structured in octets grouped together in asynchronous frames of different length and containing data bits and frame synchronization bits;

a first counter (RSA) for identifying the presence of a valid octet in said first shift register (RSC8);

a second counter (RSB) for identifying the octets forming a complete frame;

a first input data controller state machine (RS2) for verifying said frame synchronization bits and determining the loading into a second parallel input register (RSD) of the data contained in each octet shifting through said first shift register (RSC8) and validly identified by means of said first counter (RSA) and said second counter (RSB); and, a second output data controller state machine (RS9) for controlling the loading of data from said second register (RSD) to a third register (RSC6) capable of delivering data in the form of a serial bit stream of a rate lower than the rate of said incoming serial stream.

9. An apparatus as defined in claim 8, wherein said first shift register (RSC8) is an 8-bit register, said first counter (RSA) is an 8-bit counter and said second counter (RSB) is programmable to count for a set number of bits in accordance with the dimensions of the frame, thus counting the number of octets of a frame and providing a first information about the end of a frame having been reached and a second information about the presence of a supervision bit octet in said first shift register (RSC8).

10. An apparatus as defined in claim 9, wherein a 7-bit shift register (RER) is connected in cascade to said first shift register (RSC8) and upon instruction, loads said supervision bits, upon recognition provided by means of said second programmable counter (RSB).

11. An apparatus as defined in claim 8, wherein said first input data controller state machine (RS2) and said second output data controller state machine (RS9) are constituted by integrated programmable linear arrays (PLA) and wherein the first input state machine (RS2) operates at a clock frequency higher than said second output data state machine (RS9).

12. An apparatus as defined in claim 8, wherein upon the running out of said first counter (RSA) and in function of the information provided by said second counter (RSB) said first state machine (RS2) restarts said first counter (RSA) and an incrementing of said second counter (RSB).

13. An apparatus as defined in claim 8, wherein said first state machine (RS2) starts a third counter (CT80) when synchronization is lost, for counting the shifting of a predetermined number of frames (NFR), by counting the frame synchronization bits and incrementing at the end of each count a forth counter (CTNFR), before resuming the counting of the bits of a successive frame.

* * * * *